United States Patent [19]

Lauro et al.

[11] 4,398,596
[45] Aug. 16, 1983

[54] PLATE-TYPE HEAT EXCHANGERS

[75] Inventors: Fernand Lauro; Bernard Manon, both of Grenoble; Gerard Marie, Eybens, all of France

[73] Assignee: Commissariat a l'Energie Atomique, Paris, France

[21] Appl. No.: 63,333

[22] Filed: Aug. 2, 1979

[30] Foreign Application Priority Data

Aug. 9, 1978 [FR] France .............................. 78 23474

[51] Int. Cl.³ .............................................. F28F 3/08
[52] U.S. Cl. .................................. 165/167; 165/136; 165/174
[58] Field of Search ............... 165/166, 167, 170, 174, 165/159, 142, 135, 136; 62/160, 324

[56] References Cited

U.S. PATENT DOCUMENTS

| 255,575 | 3/1882 | Bopp | 165/174 |
|---|---|---|---|
| 1,833,340 | 11/1931 | Smith et al. | 165/174 |
| 1,894,957 | 1/1933 | Lucke et al. | 165/174 |
| 2,263,074 | 11/1941 | Dunham | 165/174 |
| 2,310,234 | 2/1943 | Haug | 165/174 |
| 2,782,010 | 2/1957 | Simpelaar | 165/167 |
| 2,960,160 | 11/1960 | Goodman | 165/167 |
| 3,150,028 | 9/1964 | Wennerberg | 165/167 |
| 3,291,704 | 12/1966 | Diedrich et al. | 165/166 |
| 3,945,434 | 3/1976 | Parker et al. | 165/166 |
| 3,958,631 | 5/1976 | Mentschel | 165/166 |

Primary Examiner—Daniel J. O'Connor
Attorney, Agent, or Firm—Michael N. Meller; Anthony H. Handal

[57] ABSTRACT

An improvement to the plate-type heat exchangers/-vaporators constituted in per se known manner by a stack of a plurality of rectangular plates each having four orifices in the vicinity of the apices of the rectangle and thus constituting juxtaposed parallelepipedic racks, alternately traversed in countercurrent by the hot fluid and the cold fluid, said cold racks having at their apex located in the vicinity of the cold fluid intake a strip having flow holes defining a cold fluid supply chamber and an evaporation chamber where the cold fluid evaporates by flowing as thin trickles in contact with the hot wall, the four orifices of each plate serving respectively for the admission and discharge of the cold and hot fluids, wherein the cold fluid intake is provided with a fitting or lining of a thermally insulating material which serves to create, by reducing the intake diameter, a supplementary pressure drop for said cold fluid and brings about a greater thermal gradient between said cold fluid and the hot plates in the supply pipe.

3 Claims, 3 Drawing Figures

PLATE-TYPE HEAT EXCHANGERS

BACKGROUND OF THE INVENTION

The present invention relates to plate-type heat exchangers which, in per se known manner, comprise a stack of a plurality of rectangular plates, each of which has an orifice in the vicinity of the apex of the rectangle, thus forming juxtaposed parallelepipedic racks, which are alternately traversed in countercurrent by cold fluid and hot fluid.

More specifically, the present invention relates to such plate-type heat exchangers which at the same time has an evaporator function and which are in particular used in heat pumps or in solar energy regeneration processes for evaporating a fluid with a low boiling point and making it expand in a heat engine.

Firstly, a general description of the construction of a per se known plate-type heat exchanger/evaporator will be given with reference to FIG. 1.

FIG. 1, which is a partial exploded view of part of such an exchanger, shows four adjacent rectangular plates 1, 2, 3 and 4 forming between them three parallelepipedic racks 5, 6 and 7 respectively. In the exchanger shown in FIG. 1 each of the plates 1, 2, 3 4 is provided with four orifices 1a, 1b, 1c and 1d for plate 1, 2a, 2b, 2c and 2d for plate 2 and so on, said orifices being located in the vicinity of the apices of the rectangle constituting the corresponding plate. As is also apparent from FIG. 1, these orifices aligned in the pile of plates are associated with tubular passages such as 8, 9 and 10 by means of which the corresponding orifices communicate with every other rack. The tubular areas 10 and 9 of the front face 11 of the drawing alternate with tubular areas 12 and 13 of the rear face 14. The same phenomenon occurs at the bottom of the exchanger where the tubular areas 15 and 16 on the side of front face 11 are staggered with tubular areas 17 and 18 of the rear face 14. The tubular areas can be made with a crushed joint on the side of the space between two consecutive plates. In racks 5 and 7 in the upper part of the represented exchanger portion there are horizontal plates or strips 20 which define two separate portions in each of said racks 5 and 7. These strips have a certain number of holes 21 along one of the adjacent plates.

The apparatus functions in the following manner. The cold fluid, which can for example be an easily volatilized compound such as freon, circulates in the upper part in accordance with the arrow $F_1$ through the various aligned orifices and, after traversing the tubular areas 10 on the one hand and the tubular areas 9 on the other spreads into chambers 5 and 7 which are supply chambers located in the upper part. In said supply chambers, the cold fluid runs down the walls in the form of thin trickles after traversing orifices 21 and then penetrates the evaporation chambers 5a and 7a positioned immediately below the strips 20 of chambers 5 and 7. It is then heated in contact with the hot walls of adjacent racks and gradually evaporates, finally leaving in accordance with the arrow $F_2$. However, the hot fluid enters and circulates in the apparatus in accordance with arrow $F_3$, passes through the various racks such as 6 (every other rack as for the cold fluid) which are directly supplied and then passes out after being cooled in the upper part of the exchanger in accordance with arrow $F_4$.

Thus, as is apparent from the drawing, the exchanger comprises two series of adjacent chambers, which are alternately cold and hot and in which the fluids circulate in countercurrent. The cold fluid is supplied by supply chambers which are separate from the evaporation chambers by means of strips 20 which bring about the separation of said two chamber types and by means of the outflow orifices 21 permits a distribution in the form of a cold fluid film along the adjacent hot wall.

It has been found, and this forms the object of the improvement according to the present invention, that it is possible to simply and effectively improve the operation of such an exchanger/evaporator, whilst eliminating certain disadvantages inherent in the principle thereof and which can be summarised as follows.

During the operation of a known exchanger/evaporator in accordance with FIG. 1, it has often been found that in the upper part of the apparatus, namely in the cold fluid supply chambers, there is a large amount of turbulence due to the start of boiling of the cold fluid. Attempts have been made to prevent this by providing surge tanks on either side of the separating strips 20. However, this has only reduced the phenomenon instead of completely eliminating it. However, this turbulence which increases with the temperature differences between two adjacent cold and hot compartments leads to premature boiling of the cold fluid prior to its introduction into the lower evaporation chamber, thus seriously prejudicing the regularity of cold fluid supply to the exchanger through the various orifices 20 and consequently reducing its efficiency.

BRIEF SUMMARY OF THE INVENTION

The problem of the present invention is to improve heat exchangers/evaporators of the type defined hereinbefore, so as to obviate by simple means the disadvantages referred to above.

According to the invention, this problem is solved in that the cold fluid intake is provided with a fitting or lining of thermally insulating material which serves to create, by restricting the intake diameter, a supplementary pressure drop for said cold fluid and provide a greater thermal gradient between said cold fluid and the hot plates in the supply chamber.

By providing such a thermally insulating lining at the point where the cold fluid enters the supply chambers and by providing a reduced intake diameter compared with the orifice originally cut in said plate it is possible to combine two different physical actions which, by their combined effect, completely stop the phenomena of boiling or a too sudden reheating of the cold fluid during its introduction at the top of the exchanger.

Thus, due to the fact that the material forming the lining is thermally insulating leads to a much greater thermal gradient between the cold fluid entering the apparatus and hot plates in the various supply chambers. This in itself reduces the temperature variation to which the cold fluid is suddenly exposed and consequently considerably reduces the reheating thereof. Moreover, the fact that the lining leads to the distribution in the cold racks through an orifice or a duct whose dimensions are considerably smaller than the original duct lead to the cold fluid undergoing a significant pressure drop maintaining its compression ratio at a relatively high level and thus greatly contributing to preventing the boiling of said fluid in the actual supply pipe. Thus, the distribution of cold fluid takes place in a much more advantageous manner through the various orifices 21 of plates 20 and it is only in the evaporation chambers such as 5a and 7a that said cold fluid is gradually reheated and evaporated.

According to another advantageous feature of the invention at least certain of the separating strips between the supply chambers and the evaporation chambers are provided in their lower part with a projection which serves to return the drops of fluid which could have a tendency to escape under the action of a too great heat of the hot plates against which they must remain in close engagement.

BRIEF DESCRIPTION OF THE DRAWINGS

The invention is described in greater detail hereinafter relative to an exemplified and non-limitative embodiment of the improvement to the plate-type heat exchanger/evaporator in question and with reference to FIGS. 2 and 3, wherein show.

DETAILED DESCRIPTION OF THE PREFERRED EMBODIMENTS

Figure 1:
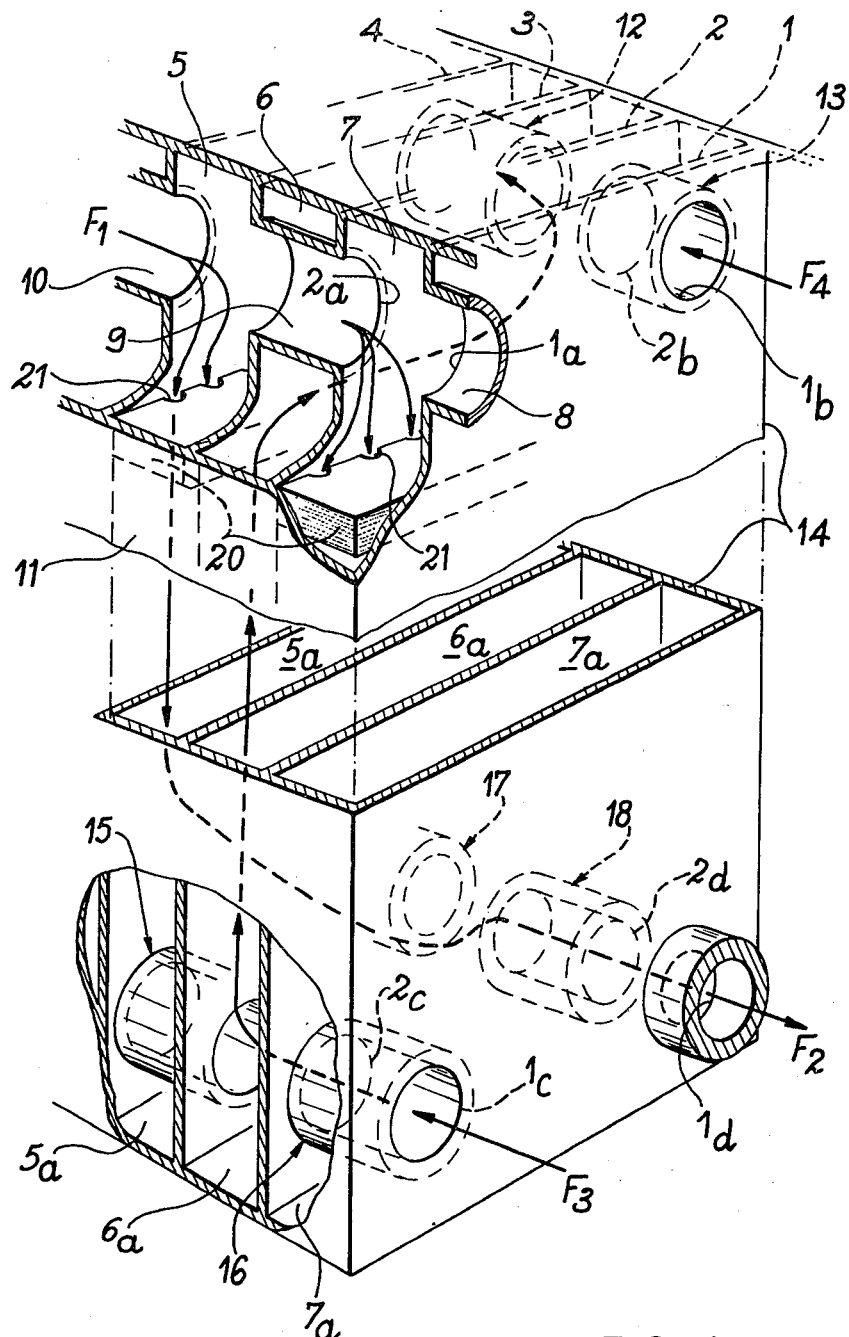
Figure 2:
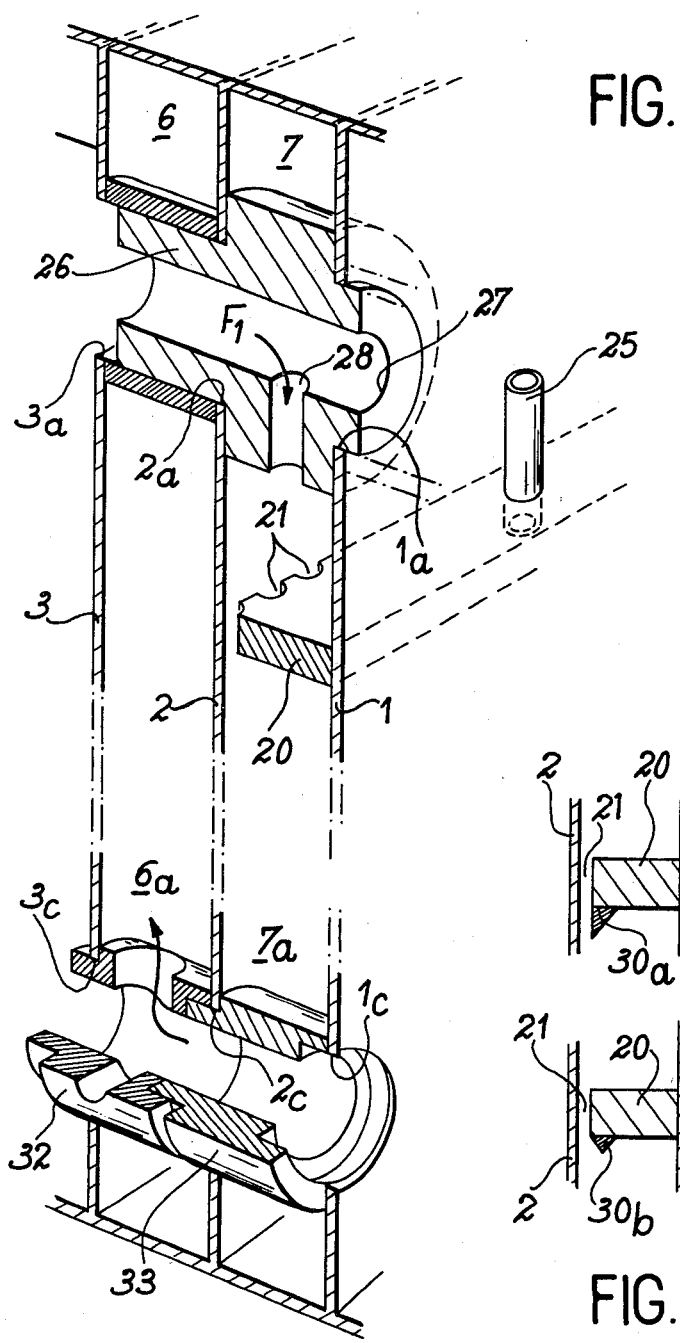
FIG. 2 in sectional and perspective view, the cold fluid intake means according to the invention.

FIG. 2 shows two consecutive racks 6, 7 constituted by adjacent plates 1, 2 and 3 having orifices 1a, 2a and 3a by means of which the cold fluid to be evaporated enters in accordance with arrow $F_1$. Chamber 7 contains strip 20 provided with orifices 21 and the surge tank 25 traversing either side of strip 20. The function of surge tank 25 is to balance the pressures between the upper supply chamber 7 and the evaporation chamber 7a. This pressure balance in these two chambers leads to a regular supply of fluid to the exchanger plates, leading to a high operating stability of the exchanger. According to the invention, a fitting or lining 26 having a central hollow pipe 27 and made from an insulating material is inserted in the passage reserved for the cold fluid through orifices 1a, 2a and 3a. To the right of supply chamber 7 this lining 26 has a radial duct 28 of small cross-section compared with that of orifices 1a, 2a and 3a and via which the cold fluid enters the supply chamber 7. As has been stated hereinbefore the lining 26 thus fulfils two functions, namely diverting to the maximum the cold fluid circulating in axial pipe 27 and in duct 28 of hot plate 2. Moreover, the small diameter of duct 28 creates an overpressure of the cold fluid in the central pipe 27 which at the same time opposes its boiling. Thus, the cold fluid can readily and normally flow along wall 2 through orifices 21 of strip 20 and penetrate the evaporation chamber 7a in which it undergoes evaporation.

It is pointed out that rows of orifices 21 can be provided on either side of strip 20, so that the cold fluid can flow along the two plates of one compartment. Although not shown in the drawings, this embodiment can easily be gathered from FIG. 2.

FIG. 2 shows the spacers 32 and 33 which serve to maintain the spacing between plates 1, 2 and 3. Spacer 32 also ensures the distribution of the hot fluid in compartment 6a.

Figure 3:
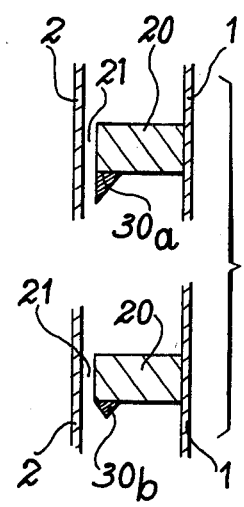
FIG. 3 two examples of projections used for causing the fluid to be evaporated to remain on a hot plate for as long as possible.

FIG. 3 shows two possible constructions 30a, 30b of projection 30 positioned in the lower part of strip 20 on the side of hot wall 2. As stated hereinbefore, the object of this arrangement is to prevent the drops of cold fluid running down the wall 2 being removed too easily from the latter under the action of calefaction on contact with hot plate 2.

According to the invention, lining 26 can be made from a random insulating material and can in particular be constituted by a pile of members in the form of washers.

What is claimed is:

1. An improvement to the plate-type heat exchangers/evaporators constituted in per se known manner by a stack of a plurality of rectangular plates each having four orifices in the vicinity of the apices of the rectangle and thus constituting juxtaposed parallelepipedic racks, alternately traversed in countercurrent by the hot fluid and the cold fluid, said cold racks having at their apex located in the vicinity of the cold fluid intake a strip having flow holes defining a cold fluid supply chamber and an evaporation chamber where the cold fluid evaporates by flowing as thin trickles in contact with the hot wall, the four orifices of each plate serving, respectively for the admission and discharge of the cold and hot fluids, wherein the cold fluid intake is provided with a fitting or lining of a thermally insulating material which serves to create, by reducing the intake diameter, a supplementary pressure drop for said cold fluid and brings about a greater thermal gradient between said cold fluid and the hot plates in the supply pipe.

2. An improvement according to claim 1, wherein the separating strip between the supply chamber and the evaporating chamber also has a projection in the lower part thereof.

3. An improvement according to claim 1, wherein the strips are traversed by surge tanks for balancing the pressure between the supply chambers and the evaporation chambers.

* * * * *